US012506857B2

(12) United States Patent
Suzuki

(10) Patent No.: US 12,506,857 B2
(45) Date of Patent: Dec. 23, 2025

(54) DISPLAY DEVICE, DISPLAY METHOD, AND COMPUTER-READABLE STORAGE MEDIUM

(71) Applicant: JVCKENWOOD Corporation, Yokohama (JP)

(72) Inventor: Tetsuji Suzuki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 110 days.

(21) Appl. No.: 18/464,306

(22) Filed: Sep. 11, 2023

(65) Prior Publication Data

US 2023/0421747 A1  Dec. 28, 2023

Related U.S. Application Data

(63) Continuation of application No. PCT/JP2022/009054, filed on Mar. 3, 2022.

(30) Foreign Application Priority Data

Mar. 18, 2021  (JP) .................................. 2021-044899

(51) Int. Cl.
*H04N 13/332* (2018.01)
*G06T 19/00* (2011.01)

(52) U.S. Cl.
CPC ......... *H04N 13/332* (2018.05); *G06T 19/006* (2013.01)

(58) Field of Classification Search
USPC .......................................................... 348/46
See application file for complete search history.

(56) References Cited

U.S. PATENT DOCUMENTS 8,823,740 B1 * 9/2014 Amirparviz .......... G02B 27/017
345/633
10,937,345 B2 * 3/2021 Funabiki ................ B60K 35/10
(Continued)

FOREIGN PATENT DOCUMENTS

JP           8-160340       6/1996
JP        2002-244074       8/2002
(Continued)

OTHER PUBLICATIONS

International Search Report and Written Opinion for International Application No. PCT/JP2022/009054 mailed on May 10, 2022, 11 pages.

*Primary Examiner* — Nigar Chowdhury
(74) *Attorney, Agent, or Firm* — Amin, Turocy & Watson, LLP

(57) ABSTRACT

A display device includes: a video generation unit configured to generate an image of a virtual object; a first display unit configured to display the image of the virtual object; a second display unit arranged on an outer side of the first display unit; and a control unit configured to adjust a transmittance of an area of the second display unit. The control unit is configured to reduce the transmittance of the area of the second display unit when a brightness of a image of a physical object in a real space on which the image of the virtual object is superimposed is higher than a brightness of the image of the virtual object, and increase the transmittance of the area of the second display unit when the brightness of the image of the physical object is not higher than the brightness of the image of the virtual object.

5 Claims, 13 Drawing Sheets

(56) References Cited

U.S. PATENT DOCUMENTS

| | | | |
|---|---|---|---|
| 11,435,585 B1* | 9/2022 | Yaroshchuk | G02B 27/1086 |
| 11,868,517 B2* | 1/2024 | Ishihara | G06F 3/147 |
| 11,874,474 B1* | 1/2024 | Lee | G02B 27/0179 |
| 11,951,834 B2* | 4/2024 | Nishizaki | G02B 27/01 |
| 2013/0063486 A1* | 3/2013 | Braun | G02B 27/017 |
| | | | 345/633 |
| 2014/0055324 A1 | 2/2014 | Hotta et al. | |
| 2014/0253605 A1 | 9/2014 | Border et al. | |
| 2016/0370592 A1* | 12/2016 | Mak | G06F 3/011 |
| 2017/0053575 A1* | 2/2017 | Ishikawa | G06F 3/011 |
| 2018/0314066 A1* | 11/2018 | Bell | G09G 5/10 |
| 2020/0294401 A1* | 9/2020 | Kerecsen | G08G 1/205 |
| 2020/0368616 A1* | 11/2020 | Delamont | H04N 13/239 |
| 2021/0055693 A1* | 2/2021 | Utsugi | H04N 9/3182 |
| 2021/0072548 A1* | 3/2021 | Kobayashi | G02B 27/0172 |
| 2021/0073958 A1* | 3/2021 | Masuda | G06T 5/94 |
| 2021/0137634 A1* | 5/2021 | Lang | A61B 90/98 |
| 2021/0165224 A1* | 6/2021 | Utsugi | G03H 1/265 |
| 2021/0199969 A1* | 7/2021 | Chen | G02B 27/286 |
| 2021/0208399 A1* | 7/2021 | Wei | G02B 27/0172 |
| 2022/0137278 A1* | 5/2022 | Lee | G02B 5/3016 |
| | | | 359/489.15 |
| 2022/0206295 A1* | 6/2022 | Calafiore | G02B 27/0101 |
| 2023/0033105 A1* | 2/2023 | Morrison | G06T 19/006 |

FOREIGN PATENT DOCUMENTS

| | | |
|---|---|---|
| JP | 2008-242134 | 10/2008 |
| JP | 2014-44334 | 3/2014 |
| JP | 2014-228595 | 12/2014 |
| JP | 2016-519322 | 6/2016 |

\* cited by examiner

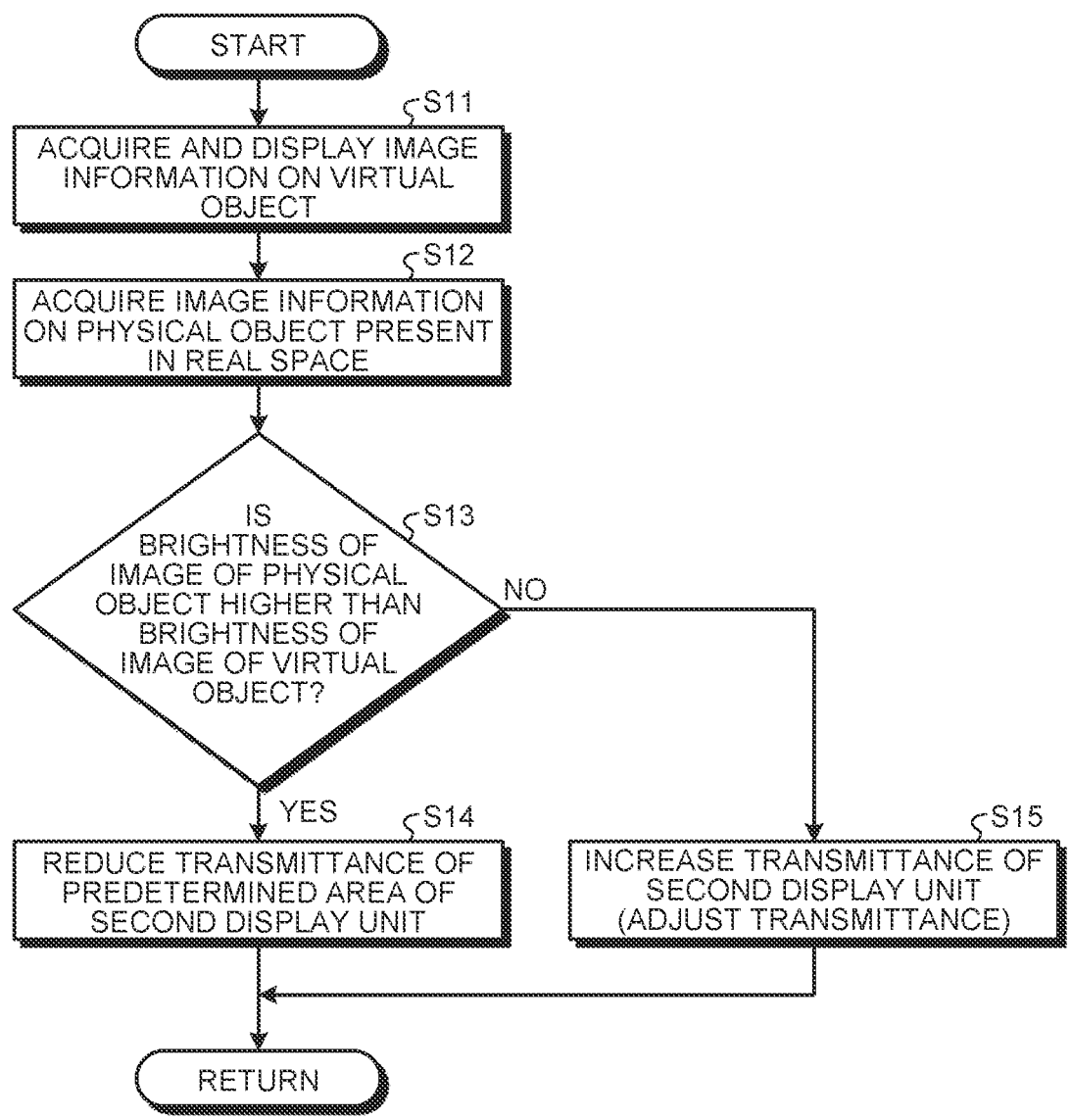

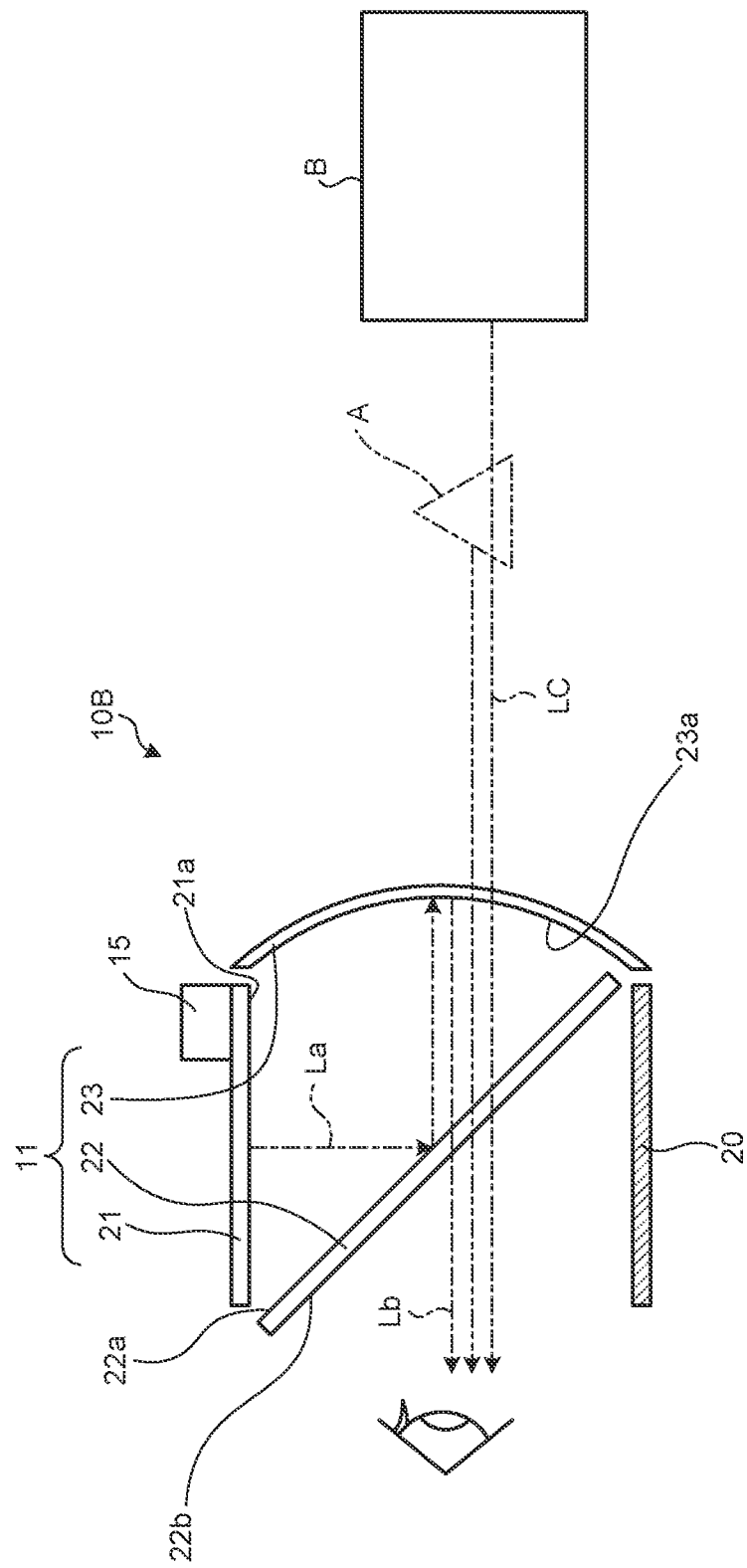

DISPLAY DEVICE, DISPLAY METHOD, AND COMPUTER-READABLE STORAGE MEDIUM

CROSS-REFERENCE TO RELATED APPLICATIONS

This application is a Continuation of International Application No. PCT/JP2022/009054, filed Mar. 3, 2022, which designates the United States, incorporated herein by reference, and which claims the benefit of priority from Japanese Patent Application No. 2021-044899, filed Mar. 18, 2021, incorporated herein by reference.

BACKGROUND

The present disclosure relates to a display device, a display method, and a computer-readable storage medium.

In recent years, a display device, such as a head-mounted type (head-mounted display (HMD)), worn on a head region of a user is known as a technology of realizing virtual reality (VR) or augmented reality (AR). This sort of display device is able to display an image by superimposing an image of a virtual object on top of an actual image that has been acquired from an outside. One example of such a display device is the device described in Japanese Laid-open Patent Publication No. 2014-228595.

In general, an actual image that has been acquired from the outside is a clear display image, whereas, the image of a virtual object is a semitransparent display image. A user views the image of the virtual object that has been superimposed on top of the clear display image. However, since the image of the virtual object is semitransparent, the user views the actual image through the virtual object; therefore, there is a problem in that a sense of reality of the image of the virtual object is consequently insufficient.

SUMMARY OF THE INVENTION

A display device according to an aspect of the present disclosure includes: an outside light measurement unit configured to acquire information on an image of a real space including a predetermined physical object; a video generation unit configured to generate an image of a virtual object; a first display unit configured to display the image of the virtual object; a second display unit arranged on an outer side of the first display unit; and a control unit configured to adjust a transmittance of an area of the second display unit. The control unit is configured to reduce the transmittance of the area of the second display unit when a brightness of the image of the physical object on which the image of the virtual object is superimposed is determined to be higher than a brightness of the image of the virtual object, and increase the transmittance of the area of the second display unit when the brightness of the image of the physical object on which the image of the virtual object is superimposed is determined to be not higher than the brightness of the image of the virtual object.

A display method according to another aspect of the present disclosure includes: acquiring information on an image of a real space including a predetermined physical object; generating an image of a virtual object; displaying the image of the virtual object on a first display unit; and reducing a transmittance of an area of a second display unit that is arranged on an outer side of the first display unit when a brightness of the image of the physical object on which the image of the virtual object is superimposed is determined to be higher than a brightness of the image of the virtual object, and increasing the transmittance of the area of the second display unit when the brightness of the image of the physical object on which the image of the virtual object is superimposed is determined to be not higher than the brightness of the image of the virtual object.

A non-transitory computer-readable storage medium according to still another aspect of the present disclosure stores a program for controlling a display device. The program causes a computer to execute: acquiring information on an image of a real space including a predetermined physical object; generating an image of a virtual object; displaying the image of the virtual object on a first display unit included in the display device; and reducing a transmittance of an area of a second display unit that is included in the display device and arranged on an outer side of the first display unit when a brightness of the image of the physical object on which the image of the virtual object is superimposed is determined to be higher than a brightness of the image of the virtual object, and increasing the transmittance of the area of the second display unit when the brightness of the image of the physical object on which the image of the virtual object is superimposed is determined to be not higher than the brightness of the image of the virtual object.

BRIEF DESCRIPTION OF THE DRAWINGS

FIG. 3 is a flowchart illustrating the flow of a display method according to the first embodiment;

FIG. 10 is a schematic diagram illustrating a specific configuration of a display device according to a third embodiment;

DETAILED DESCRIPTION

Preferred embodiments of a display device, a display method, and a computer-readable storage medium according to the present disclosure will be explained in detail with reference to accompanying drawings. Furthermore, the present invention is not limited to the embodiments.

First Embodiment

Display

The display device according to the first embodiment will be described by applying the display device to a display device with a head-mounted type that implements augmented reality.

Figure 1:
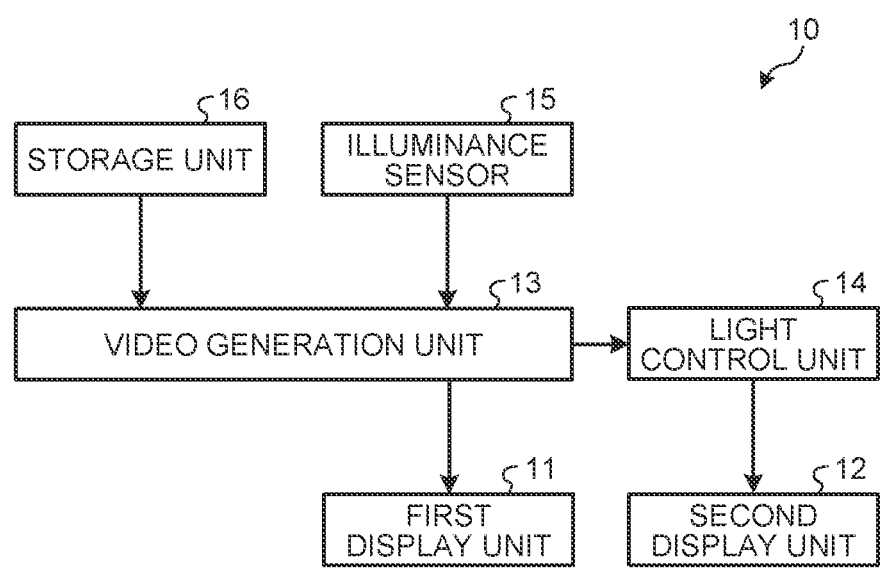
FIG. 1 is a block configuration diagram illustrating a display device according to a first embodiment.

FIG. 1 is a block configuration diagram illustrating the display device according to the first embodiment.

In the first embodiment, as illustrated in FIG. 1, a display device 10 includes a first display unit 11, a second display unit 12, a video generation unit 13, a light control unit (control unit) 14, an illuminance sensor (outside light measurement unit) 15, and a storage unit 16.

The first display unit 11 is arranged in the interior of the display device 10. The first display unit 11 acquires a video signal that is related to an image of a virtual object from the video generation unit 13, and displays the image of the virtual object.

The second display unit 12 is arranged on the outer side of the image of the virtual object. The second display unit 12 acquires a control signal from the light control unit 14, and adjusts the transmittance of the second display unit 12.

The video generation unit 13 generates the virtual object based on the video signal, and causes the first display unit 11 to display the image of the virtual object. Furthermore, the video generation unit 13 is able to adjust brightness or a color of the image of the virtual object in accordance with the brightness of a real space. In addition, the video generation unit 13 transmits the video signal related to the image of the virtual object that has been acquired from the storage unit 16 to the first display unit 11 and the second display unit 12. Furthermore, the video generation unit 13 transmits information on the brightness of the real space that has been acquired from the illuminance sensor 15 to the light control unit 14.

The light control unit 14 is able to adjust the transmittance of the second display unit 12 in accordance with the brightness of the real space that is input from the video generation unit 13. The light control unit 14 is able to adjust the transmittance of the area that corresponds to the image of the virtual object. The light control unit 14 determines, based on the video signal that is related to the image of the virtual object acquired from the video generation unit 13 and based on the information on the brightness of the real space, whether or not the brightness of the image of the physical object that is present in the real space is higher than the brightness of the image of the virtual object. The light control unit 14 transmits the control signal to the second display unit 12.

The illuminance sensor 15 measures outside light. In other words, the illuminance sensor 15 measures the brightness (illuminance) of the real space by acquiring information on an image around the display device 10, in particular, information on an image of a site located on the near side, that is, information on the image of the real space. For example, the illuminance sensor 15 is a CMOS image sensor, but the illuminance sensor 15 is not limited to this configuration. The illuminance sensor 15 transmits the information on the brightness of the real space to the video generation unit 13.

The storage unit 16 stores therein a video signal related to the image of the virtual object, and the like. The storage unit 16 transmits the video signal related to the image of the virtual object to the video generation unit 13. Furthermore, the video signal related to the image of the virtual object stored in the storage unit 16 may be stored in advance, and, in addition, the video signal related to the image of the virtual object may be acquired via a communication unit (not illustrated) that is able to be connected to outside. The storage unit 16 is, for example, a memory or a hard disk drive (HDD).

In addition, each of the video generation unit 13 and the light control unit 14 is constituted by at least one of, for example, a central processing unit (CPU), a digital signal processor (DSP), a random access memory (RAM), and a read only memory (ROM).

Figure 2:
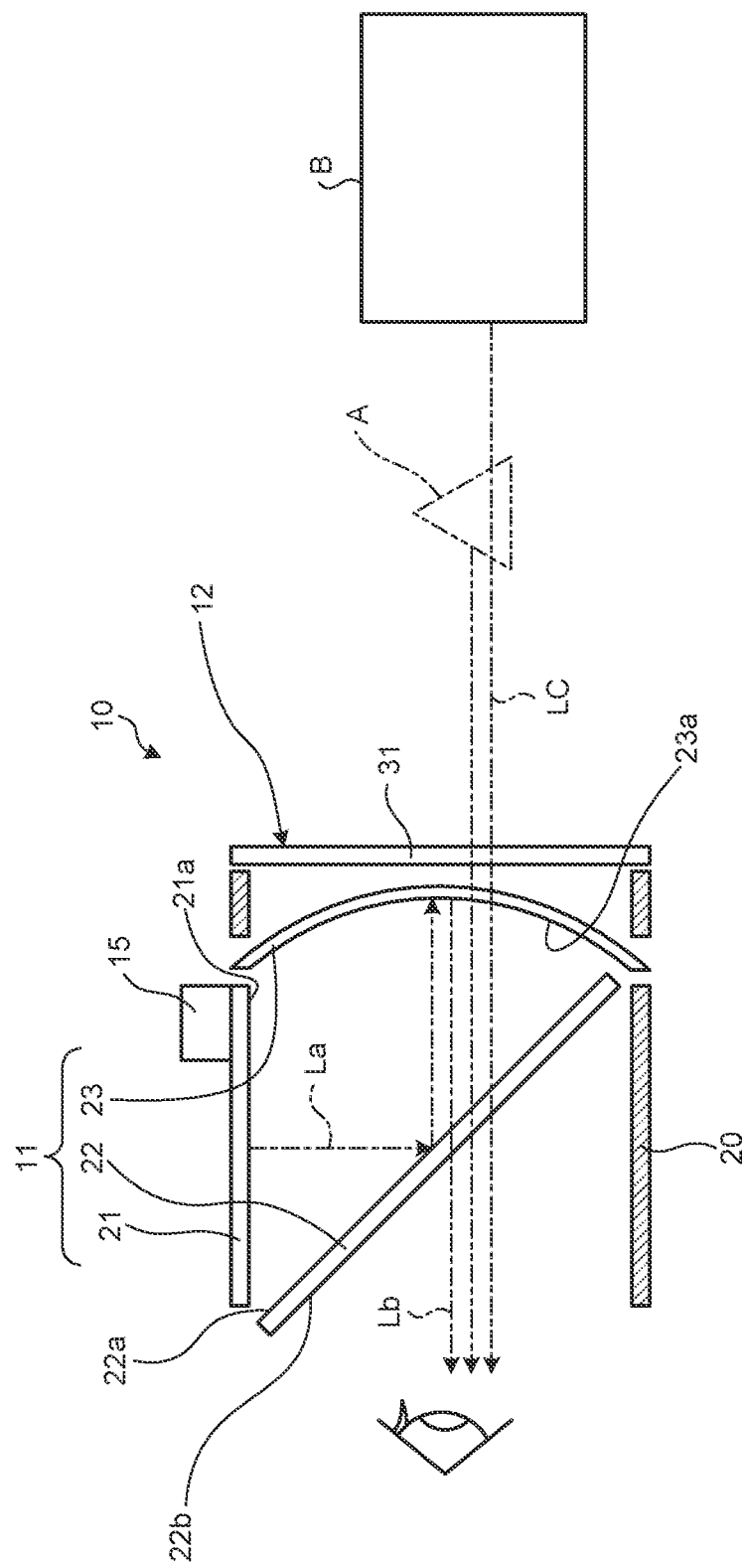
FIG. 2 is a schematic diagram illustrating a specific configuration of the display device.

FIG. 2 is a schematic diagram illustrating a specific configuration of the display device.

As illustrated in FIG. 2, the first display unit 11 is supported by an outer package 20. The first display unit 11 includes a first display panel 21, a half mirror 22, and a combiner mirror 23. The first display panel 21 is horizontally arranged at an upper part of the outer package 20. The first display panel 21 has a planar shape, and various display panels, such as a liquid crystal panel, an organic EL panel, or a plasma panel, may be used. The first display panel 21 includes a display surface 21a, on which an image of a virtual object A is able to be displayed, that is arranged on the bottom surface of the first display panel 21. The display surface 21a is able to irradiate display light La toward a lower place, that is, toward the interior of the outer package 20.

The half mirror 22 is arranged in the interior of the outer package 20 on the lower side of the first display panel 21. The half mirror 22 is arranged so as to be inclined at a predetermined angle with respect to the first display panel 21. On the half mirror 22, a reflection coating 22a is provided on the top surface side of the half mirror 22, and an anti-reflection coating 22b is provided on the bottom surface side of the half mirror 22. The half mirror 22 reflects light received from the upper side and transmits the light received from the front side. In other words, the half mirror 22 reflects the display light La emitted from the first display panel 21 toward the combiner mirror 23. Furthermore, the half mirror 22 transmits reflected light Lb that has been reflected at the combiner mirror 23.

The combiner mirror 23 is arranged in the interior of the outer package 20 at a position in front of the half mirror 22. The combiner mirror 23 is vertically arranged at the front part of the outer package 20. The combiner mirror 23 has a concave shape. The combiner mirror 23 is provided with a reflection coating 23a on the inner surface side of the combiner mirror 23. The combiner mirror 23 reflects the display light La that has been irradiated from the first display panel 21 and is reflected at the half mirror 22 and irradiates the light towards the half mirror 22 as the reflected light Lb.

The first display unit 11 reflects the display light La, which has been irradiated from the first display panel 21, by the half mirror 22 in a forward direction, reflects the display light La by the combiner mirror 23 in a backward direction, allows the display light La to pass through the half mirror 22 as the reflected light Lb, and guides the reflected light Lb to the eyeballs of the user.

Accordingly, the user visually recognizes that the image of the virtual object A displayed by the first display unit 11 is seemed to be located at a position on the near side of the display device 10.

In addition, the combiner mirror 23 transmits real image light Lc that constitutes an image of a physical object B that is present in the real space to the half mirror 22 side and captures the image. The first display unit 11 allows the real image light Lc that constitutes the image of the physical object B to pass through both of the combiner mirror 23 and the half mirror 22 and to reach the right and left eyeballs of the user. As a result, the user directly and visually recognizes the image of the physical object B that is present in the real space.

At this time, both of the reflected light Lb (the display light La) that generates the image of the virtual object A and the real image light Lc that generates the image of the physical object B that is present in the real space reach the eyeballs of the user. As a result, the user visually recognizes a composite image in which the image of the virtual object A is superimposed on top of the image of the physical object B that is present in the real space.

The second display unit 12 includes a second display panel 31. The second display panel 31 is supported so as to be vertically arranged at the front part of the outer package 20 in the vertical direction. The second display panel 31 is arranged on the outside of the combiner mirror 23 with a predetermined gap. The second display panel 31 has a planar shape, and various display panels, such as a liquid crystal panel, an organic EL panel, and a plasma panel, may be used. On the second display panel 31, pixels are provided in a matrix manner and are able to be controlled such that each of the pixels is adjusted between a transparent state and an opaque state. As a result, the transmittance of the second display panel 31 is able to be adjusted between 0% and 100%.

As illustrated in FIG. 1 and FIG. 2, the illuminance sensor 15 measures the brightness of the real space. The light control unit 14 is able to adjust, in accordance with the brightness of the image of the light incident from the real space (the image of the physical object B), the transmittance of the area of the second display panel 31 corresponding to the image of the virtual object A (here, a triangular image that corresponds to the shape of the virtual object A).

Specifically, a light beam of a virtual image (image) of the virtual object A that has been displayed by the first display panel 21 passes across the second display panel 31, so that the transmittance of the area that corresponds to the crossing portion is adjusted. Here, at the central part of the field of view, the second display panel 31 is closer to the combiner mirror 23, but, at the peripheral part of the field of view, the distance between the second display panel 31 and the combiner mirror 23 increases, so that a larger panel is needed to cover the entire field of view. The second display panel 31 illustrated in FIG. 2 is a flat panel, but a curved surface panel may also be used instead of the flat panel. It is desirable that the curved surface shape of this curved surface panel is a shape that is parallel to the curved surface shape of the combiner mirror 23. It is possible to perform adjustment control on various shapes in accordance with the shape of the image of the virtual object A over the field of view from the center of the field of view to the peripheral part thereof. It is possible to reduce the size of the device and finely perform adjustment control up to the area around the field of view.

In addition, the video generation unit 13 and the light control unit 14 may be installed at any location.

Display Method

FIG. 3 is a flowchart illustrating the flow of a display method according to the first embodiment.

As illustrated in FIG. 1 to FIG. 3, at Step S11, the video generation unit 13 acquires and displays the image information on the virtual object A on the basis of the video signal. At Step S12, the illuminance sensor 15 acquires the image information on the physical object B that is present in the real space, and then, acquires the brightness of the image of the physical object B that is present in the real space. At Step S13, the light control unit 14 determines whether or not the brightness of the image of the physical object B that is present in the real space is higher than the brightness of the image of the virtual object A. In addition, the process for determining the brightness of the image performed at Step S13 is determined on the basis of the determination value that is set in advance. The determination value is set in advance on the basis of the sharpness of the image of the virtual object A by using an experiment, a simulation, or the like.

Here, if the light control unit 14 determines that the brightness of the image of the physical object B that is present in the real space is higher than the brightness of the image of the virtual object A (Yes at Step S13), the process proceeds to Step S14. At Step S14, the light control unit 14 reduces the transmittance of a predetermined area of the second display unit 12 that corresponds to the image of the virtual object A. Then, the second display unit 12 enters a state in which the light emitted from the real space is less likely to be transmitted in the predetermined area, and the background side of the image of the virtual object A becomes darker. As a result, the user is able to sharply and visually recognize the image of the virtual object A without being affected by the brightness of the image of the physical object B.

I contrast, at Step S13, if the light control unit 14 determines that the brightness of the image of the physical object B that is present in the real space is not higher than the brightness of the image of the virtual object A (No at Step S13), the process proceeds to Step S15. At Step S15, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A, and is able to sharply and visually recognize both of the image of the virtual object A and the image of the physical object B.

Furthermore, at Step S15, in addition to simply increasing the transmittance of the predetermined area of the second display unit 12, it may be possible to adjust the transmittance of the predetermined area of the second display unit 12 in accordance with both of the brightness of the image of the physical object B and the brightness of the image of the virtual object A.

Figure 4A:
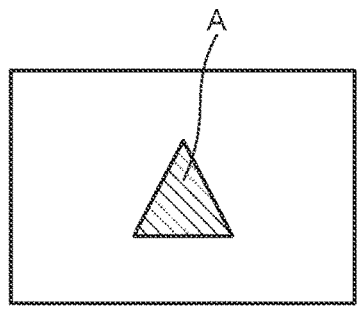
FIG. 4A is a schematic diagram illustrating an image of a first display unit.
Figure 4B:
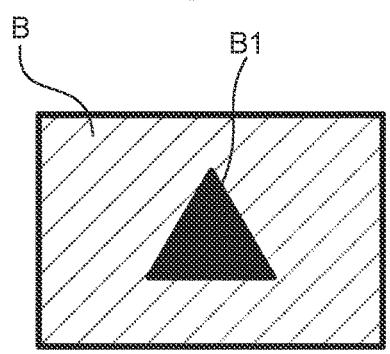
FIG. 4B is a schematic diagram illustrating an image of a second display unit.
Figure 4C:
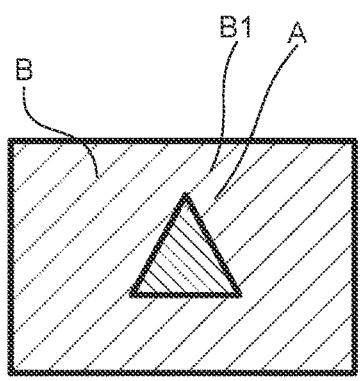
FIG. 4C is a schematic diagram illustrating an image obtained by superimposing the image of the first display unit on top of the image of the second display unit.
Figure 4D:
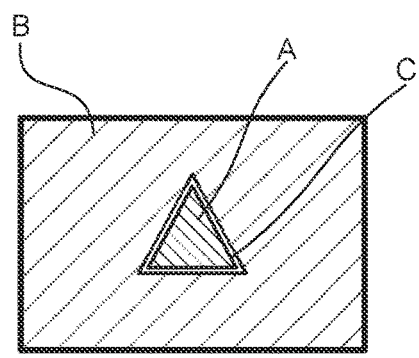
FIG. 4D is a schematic diagram illustrating an image obtained by superimposing the image of the first display unit on top of the image of the second display unit and by performing an enhancement process on the obtained image.

FIG. 4A is a schematic diagram illustrating the image of the first display unit, FIG. 4B is a schematic diagram of the image of the second display unit, FIG. 4C is a schematic diagram illustrating the image obtained by superimposing the image of the first display unit on top of the image of the second display unit, and FIG. 4D is a schematic diagram illustrating the image obtained by superimposing the image of the first display unit on top of the image of the second display unit, and performing an enhancement process on the obtained image.

As illustrated in FIG. 4A, the image of the virtual object A is displayed on the first display unit 11. As illustrated in FIG. 4B, the light control unit 14 reduces the transmittance of a predetermined area B1 that corresponds to the image of the virtual object A in the second display unit 12 and darken the predetermined area B1. Then, as illustrated in FIG. 4C, the image of the virtual object A of the first display unit 11 is displayed on the predetermined area B1 that has been darkened and that is included in the second display unit 12. At this time, it is preferable that the size of the predetermined area B1 to be darkened is set to be the same as the size of the image of the virtual object A or larger than that of the virtual object A. Consequently, the user is able to sharply and visually recognize the image of the virtual object A. In addition, as illustrated in FIG. 4D, the video generation unit 13 is able to sharply display the image of the virtual object A by performing the enhancement process of forming an edge C around the image of the virtual object A. The color of the edge C to be used is preferably white or black, or, preferably an opponent color of the color of the image of the virtual object A.

Modification

Figure 5:
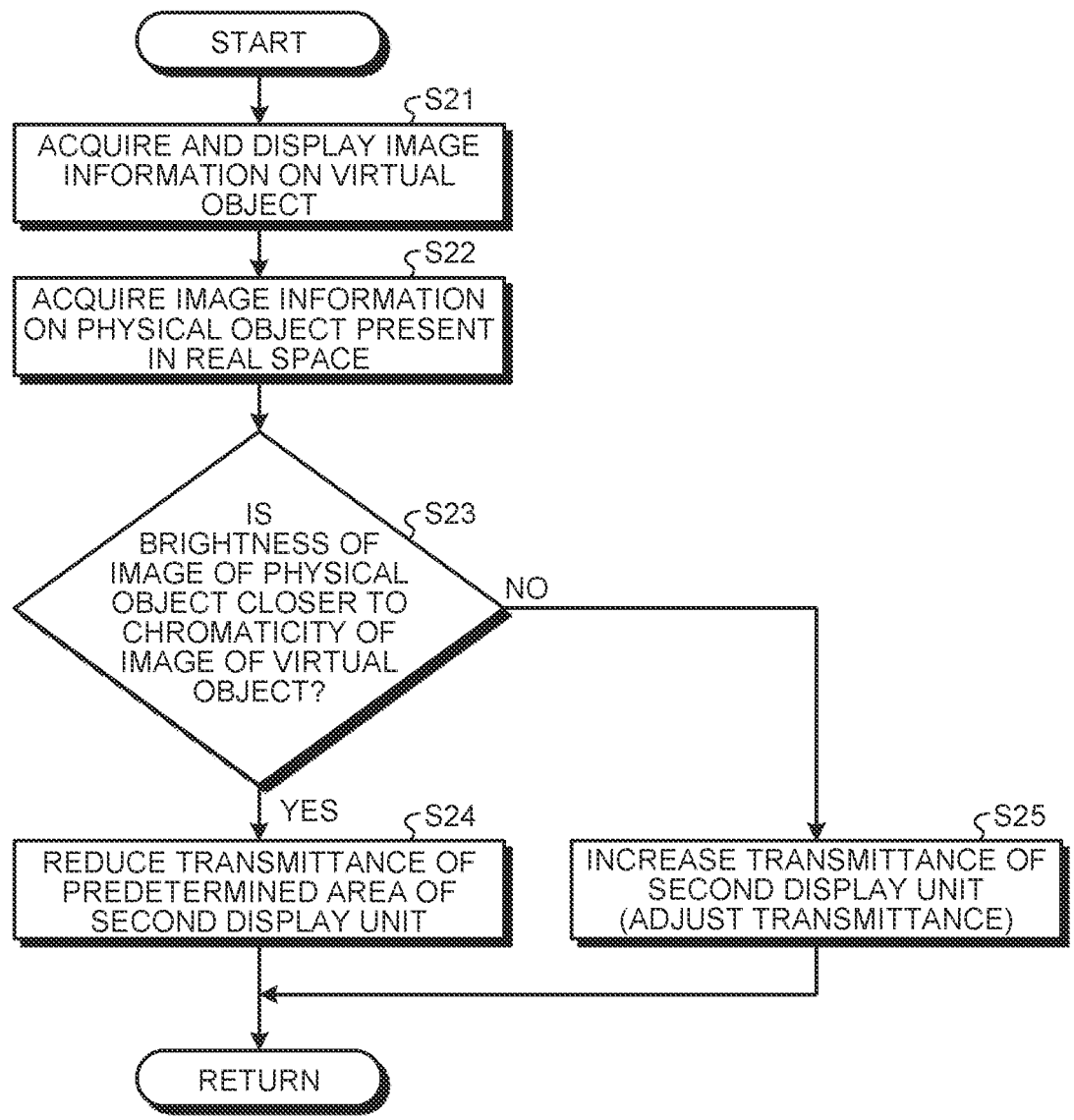
FIG. 5 is a flowchart illustrating the flow of a modification of the display method according to the first embodiment.

FIG. 5 is a flowchart illustrating the flow of the modification of the display method according to the first embodiment.

As illustrated in FIG. 1, FIG. 2, and FIG. 5, at Step S21, the video generation unit 13 acquires the image information on the virtual object A based on the video signal and displays the acquired image information. At Step S22, the illuminance sensor 15 acquires the image information on the physical object B that is present in the real space, and then, acquires the brightness of the image of the physical object B that is present in the real space. At Step S23, the light control unit 14 determines whether or not the chromaticity of the image of the physical object B that is present in the real space is close to the chromaticity of the image of the virtual object A. The chromaticity is the characteristic of a color regardless of brightness of the color, and quantitatively indicates the color of light except for lightness, a hue, and color saturation. Furthermore, the chromaticity determination process performed on the image at Step S13 is determined on the basis of a determination value that is set in advance. The determination value is set on the basis of the degree of the sharpness of the image of the virtual object A obtained by an experiment, a simulation, or the like that has been performed in advance.

Here, if the light control unit 14 determines that the chromaticity of the image of the physical object B that is present in the real space is close to the chromaticity of the image of the virtual object A (Yes at Step S23), the process proceeds to Step S24. At Step S24, the light control unit 14 reduces the transmittance of the predetermined area of the second display unit 12 that corresponds to the image of the virtual object A. Then, the second display unit 12 enters a state in which the light emitted from the real space is less likely to be transmitted in the predetermined area, and the background side of the image of the virtual object A becomes darker. As a result, the user is able to sharply and visually recognize the image of the virtual object A without being affected by the chromaticity of the image of the physical object B. At this time, the video generation unit 13 may clearly produce the image of the virtual object A by adjusting the color of the image of the virtual object A.

In contrast, at Step S13, if the light control unit 14 determines that the chromaticity of the image of the physical object B that is present in the real space is not close to the chromaticity of the image of the virtual object A (No at Step S23), the process proceeds to Step S25. At Step S25, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A, and is able to sharply and visually recognize both of the image of the virtual object A and the image of the physical object B.

Second Embodiment

Figure 6:
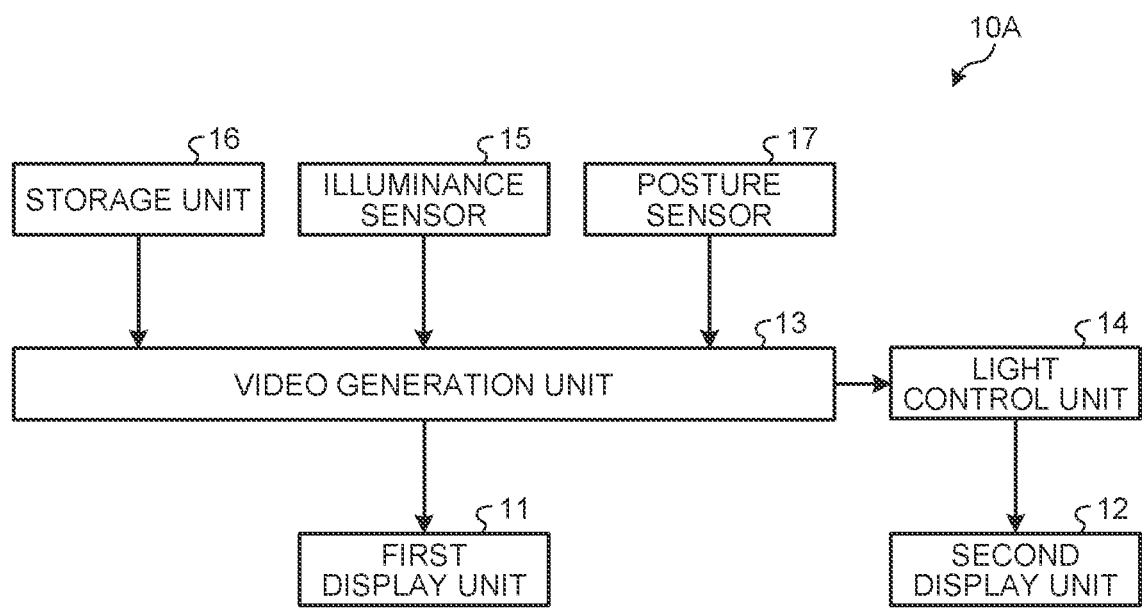
FIG. 6 is a block configuration diagram illustrating a display device according to a second embodiment.

FIG. 6 is a block configuration diagram illustrating a display device according to a second embodiment.

In the second embodiment, as illustrated in FIG. 6, a display device 10A includes the first display unit 11, the second display unit 12, the video generation unit 13, the light control unit 14, the illuminance sensor 15, the storage unit 16, and an posture sensor (walk detection unit) 17. Here, the first display unit 11, the second display unit 12, the video generation unit 13, the light control unit 14, the illuminance sensor 15, and the storage unit 16 are the same as those described in the first embodiment, and the description thereof will be omitted.

The posture sensor 17 detects a walk of a user. The posture sensor 17 transmits the detection result of the walk to the video generation unit 13. The video generation unit 13 is able to adjust the brightness and the color of an image of a virtual object in accordance with the detection result obtained by the posture sensor 17. Furthermore, the video generation unit 13 transmits the detection result of the walk that has been acquired from the posture sensor 17 to the light control unit 14. The light control unit 14 is able to adjust the transmittance of the second display unit 12 in accordance with the detection result that has been obtained by the posture sensor 17 and that is input from the video generation unit 13. Specifically, if the posture sensor 17 detects a walk of the user, the light control unit 14 performs adjustment such that the transmittance of the predetermined area of the second display unit 12 is increased.

Figure 7:
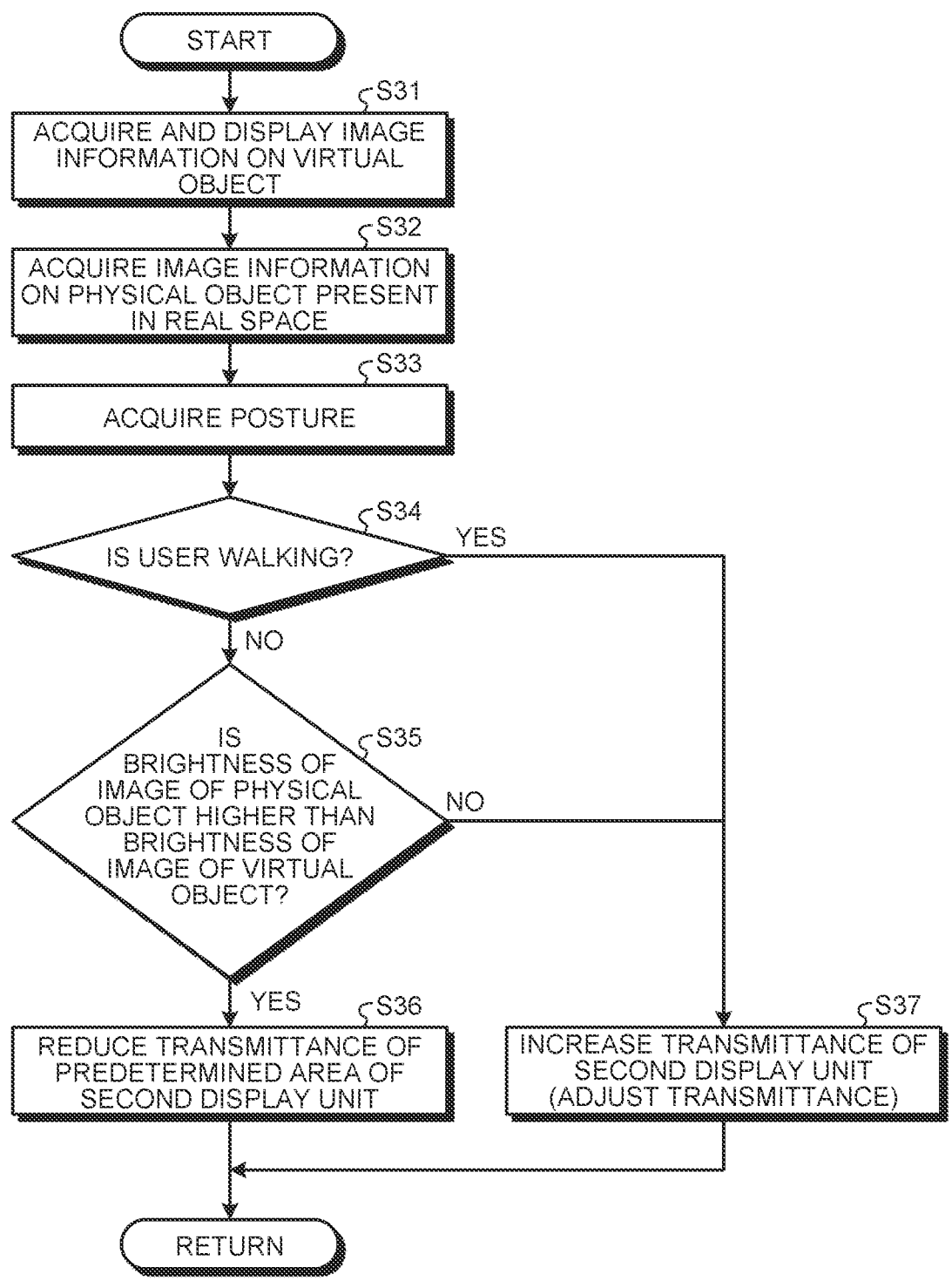
FIG. 7 is a flowchart illustrating the flow of a display method according to the second embodiment.

FIG. 7 is a flowchart illustrating the flow of a display method according to the second embodiment.

As illustrated in FIG. 6 and FIG. 7, at Step S31, the video generation unit 13 acquires the image information on the virtual object A on the basis of the video signal and displays the acquired image information. At Step S32, the illuminance sensor 15 acquires the image information on the physical object B that is present in the real space, and then, acquires the brightness of the image of the physical object B that is present in the real space. At Step S33, a walk state of the user detected by the posture sensor 17 is acquired.

At Step S34, the light control unit 14 determines whether or not the user is walking on the basis of the walk state of the user detected by the posture sensor 17. Here, if the light control unit 14 determines that the user is not walking (No at Step S34), the process proceeds to Step S35. At Step S35, the light control unit 14 determines whether or not the brightness of the image of the physical object B that is present in the real space is higher than the brightness of the image of the virtual object A. Here, if the light control unit 14 determines that the brightness of the image of the physical object B that is present in the real space is higher than the brightness of the image of the virtual object A (Yes at Step S35), the process proceeds to Step S36. At Step S36, the light control unit 14 reduces the transmittance of the predetermined area of the second display unit 12 that corresponds to the image of the virtual object A. Then, the second display unit 12 enters a state in which the light emitted from the real space is less likely to be transmitted in the predetermined area, and the background side of the image of the virtual object A becomes darker. As a result, the user is able to sharply and visually recognize the image of the virtual object A without being affected by the brightness of the image of the physical object B.

In contrast, at Step S35, if the light control unit 14 determines that the brightness of the image of the physical object B that is present in the real space is not higher than the brightness of the image of the virtual object A (No at Step S35), the process proceeds to Step S37. At Step S37, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A, and is able to sharply and visually recognize both of the image of the virtual object A and the image of the physical object B.

In addition, at Step S34, if the light control unit 14 determines that the user is walking (Yes at Step S34), the process proceeds to Step S37. At Step S37, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A. In other words, the user visually recognizes the image of the virtual object A while walking, and, in addition, the user is able to visually recognize the image of the physical object B, that is, the background image of the surroundings, through the image of the virtual object A, and is able to safely walk.

Furthermore, if it is determined that the user is walking, it is preferable that the light control unit 14 further increases the transmittance of the predetermined area of the second display unit 12 as compared to the case where it is determined that the brightness of the image of the physical object B that is present in the real space is not higher than the brightness of the image of the virtual object A. That is, if it is determined that the user is walking, it is preferable to increase the transmittance of the predetermined area of the second display unit 12 up to nearly 100%. In addition, at this time, an edge enhancement process may be performed on the image of the virtual object A.

First Modification

Figure 8:
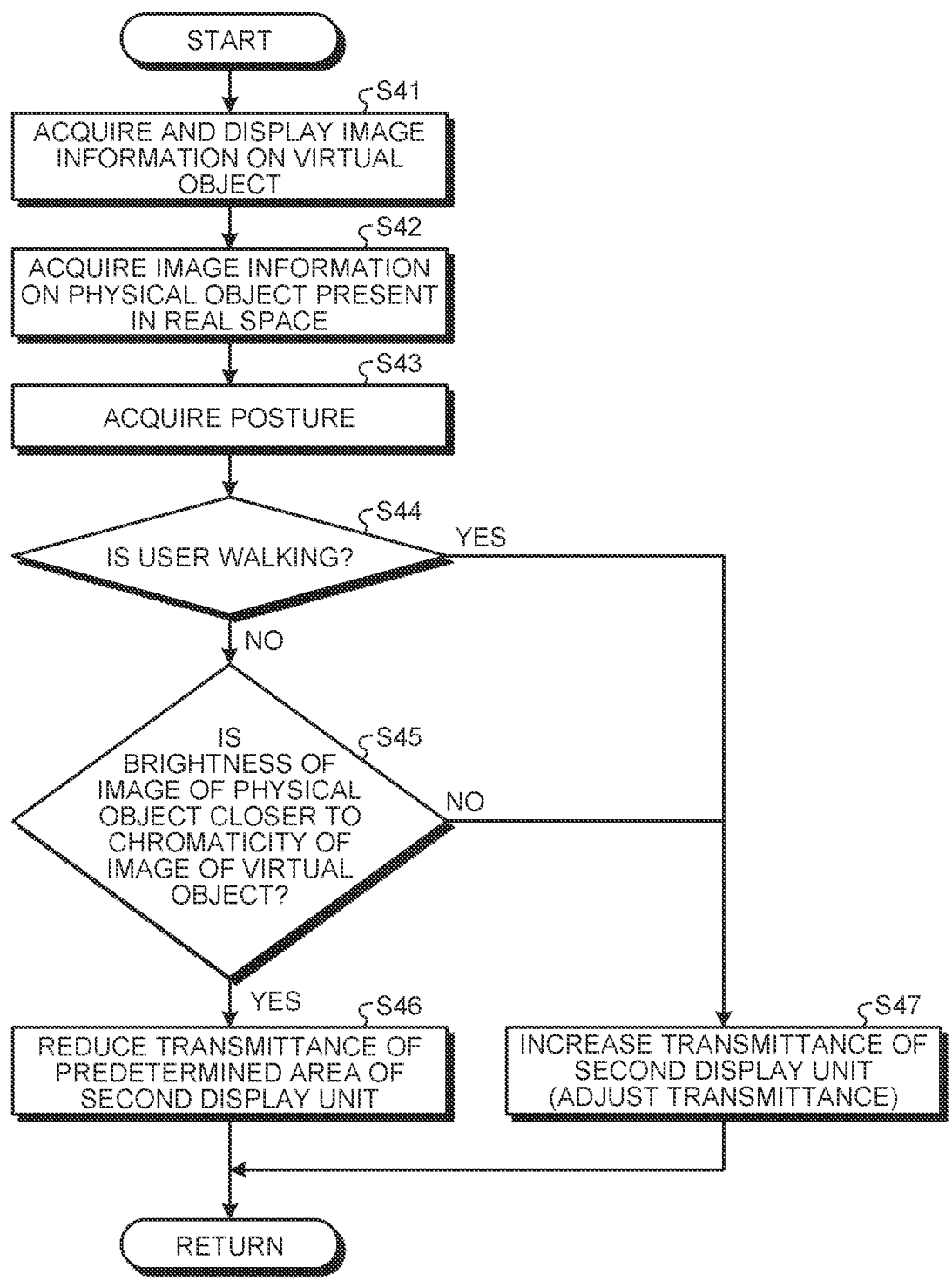
FIG. 8 is a flowchart illustrating the flow of a first modification of the display method according to the second embodiment.

FIG. 8 is a flowchart illustrating the flow of a first modification of the display method according to the second embodiment.

As illustrated in FIG. 6 and FIG. 8, at Step S41, the video generation unit 13 acquires the image information on the virtual object A on the basis of the video signal and displays the acquired image information. At Step S42, the illuminance sensor 15 acquires the image information on the physical object B that is present in the real space, and then, acquires the brightness of the image of the physical object B that is present in the real space. At Step S43, the walk state of the user that has been detected by the posture sensor 17 is acquired.

At Step S44, the light control unit 14 determines whether or not the user is walking on the basis of the walk state of the user that has been detected by the posture sensor 17. Here, if the light control unit 14 determines that the user is not walking (No at Step S44), the process proceeds to Step S45. At Step S45, the light control unit 14 determines whether or not the chromaticity of the image of the physical object B that is present in the real space is close to the chromaticity of the image of the virtual object A. Here, if the light control unit 14 determines that the chromaticity of the image of the physical object B that is present in the real space is close to the chromaticity of the image of the virtual object A (Yes at Step S45), the process proceeds to Step S46. At Step S46, the light control unit 14 reduces the transmittance of the predetermined area of the second display unit 12 that corresponds to the image of the virtual object A. Then, the second display unit 12 enters a state in which the light emitted from the real space is less likely to be transmitted in the predetermined area, and the background side of the image of the virtual object A becomes darker. As a result, the user is able to sharply and visually recognize the image of the virtual object A without being affected by the brightness of the image of the physical object B.

In contrast, at Step S45, if the light control unit 14 determines that the chromaticity of the image of the physical object B that is present in the real space is not close to the chromaticity of the image of the virtual object A (No at Step S45), the process proceeds to Step S47. At Step S47, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A, and is able to sharply and visually recognize both of the image of the virtual object A and the image of the physical object B.

In addition, at Step S44, if the light control unit 14 determines that the user is walking (Yes at Step S44), the process proceeds to Step S47. At Step S47, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A. In other words, the user visually recognizes the image of the virtual object A while walking, and, in addition, the user is able to visually recognize the image of the physical object B, that is, the background image of the surroundings, through the image of the virtual object A, and is able to safely walk.

Furthermore, if it is determined that the user is walking, it is preferable that the light control unit 14 further increases the transmittance of the predetermined area of the second display unit 12 as compared to the case where it is determined that the brightness of the image of the physical object B that is present in the real space is not higher than the brightness of the image of the virtual object A. That is, if it is determined that the user is walking, it is preferable to increase the transmittance of the predetermined area of the second display unit 12 up to nearly 100%. In addition, at this time, an edge enhancement process may be performed on the image of the virtual object A.

Second Modification

Figure 9:
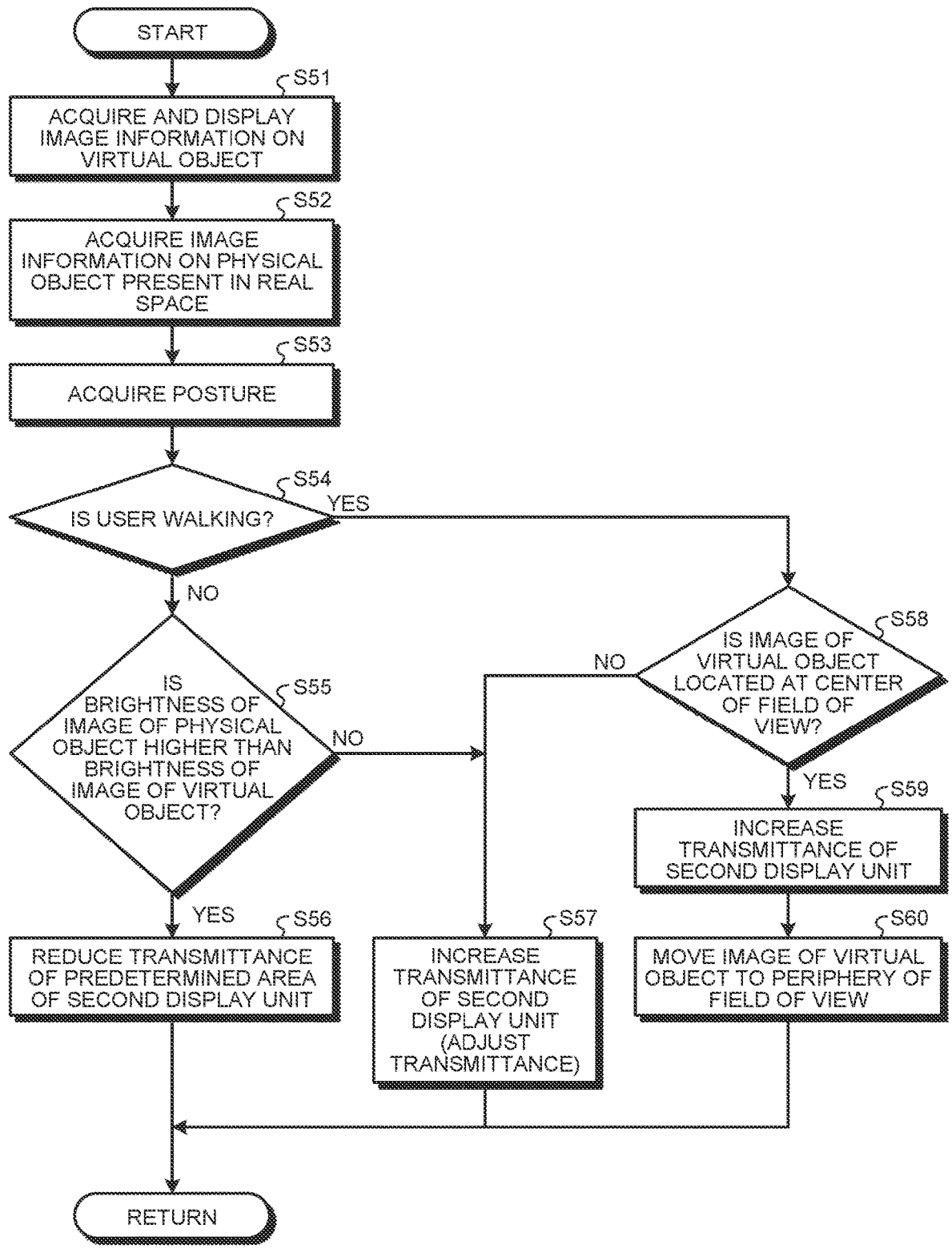
FIG. 9 is a flowchart illustrating the flow of a second modification of the display method according to the second embodiment.

FIG. 9 is a flowchart illustrating the flow of the second modification of the display method according to the second embodiment.

As illustrated in FIG. 6 and FIG. 9, at Step S51, the video generation unit 13 acquires the image information on the virtual object A on the basis of the video signal and displays the acquired image information. At Step S52, the illuminance sensor 15 acquires the image information on the physical object B that is present in the real space by way of the combiner mirror 23, and then, acquires the brightness of the image of the physical object B that is present in the real space. At Step S53, the video generation unit 13 acquires the walk state of the user that has been detected by the posture sensor 17.

At Step S54, the light control unit 14 determines whether or not the user is walking on the basis of the walk state of the user that has been detected by the posture sensor 17. Here, if the light control unit 14 determines that the user is not walking (No at Step S54), the process proceeds to Step S55. At Step S55, the light control unit 14 determines whether or not the brightness of the image of the physical object B that is present in the real space is higher than the brightness of the image of the virtual object A. Here, if the light control unit 14 determines that the brightness of the image of the physical object B that is present in the real space is higher than the brightness of the image of the virtual object A (Yes at Step S55), the process proceeds to Step S56. At Step S56, the light control unit 14 reduces the transmittance of the predetermined area of the second display unit 12 that corresponds to the image of the virtual object A. Then, the second display unit 12 enters a state in which the light emitted from the real space is less likely to be transmitted in the predetermined area, and the background side of the image of the virtual object A becomes darker. As a result, the user is able to sharply and visually recognize the image of the virtual object A without being affected by the brightness of the image of the physical object B.

In contrast, at Step S55, if the light control unit 14 determines that the brightness of the image of the physical object B that is present in the real space is not higher than the brightness of the image of the virtual object A (No at Step S55), the process proceeds to Step S57. At Step S57, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A, and is able to sharply and visually recognize both of the image of the virtual object A and the image of the physical object B.

In addition, at Step S54, if the light control unit 14 determines that the user is walking (Yes at Step S54), the light control unit 14 transmits the determination result to the video generation unit 13, and proceeds to Step S58. At Step S58, the video generation unit 13 determines whether or not the image of the virtual object A is located at the center of the field of view of the user. In this case, for example, the video generation unit 13 determines whether a part of the image of the virtual object A is superimposed on top of the center of the field of view of the user. In addition, the video generation unit 13 may also determine whether a part of the image of the virtual object A is located in the predetermined area that corresponds to the center of the field of view of the user. Here, if the video generation unit 13 determines that the image of the virtual object A is located at the center of the field of view of the user (Yes at Step S58), the video generation unit 13 transmits the obtained determination result to the light control unit 14, and, at Step S59, the light control unit 14 increases the transmittance of the predetermined area of the second display unit 12 that corresponds to the image of the virtual object A. At this time, the video generation unit 13 may perform the adjustment process such that the brightness of the image of the virtual object A is reduced.

Then, at Step S60, the video generation unit 13 moves the image of the virtual object A to the peripheral part of the field of view of the user, that is, moves the image of the virtual object A to the end portion of the field of view. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A. In addition, the image of the virtual object A is displayed at the end portion of the field of view of the user instead of the central part of the field of view of the user. As a result, the user is able to visually recognize the image of the physical object B without being blocked by the image of the virtual object A. In other words, the user visually recognizes the image of the virtual object A while walking, and, in addition, the user is able to visually recognize the background image of the surroundings, and is able to safely walk.

In contrast, at Step S58, if the video generation unit 13 determines that the image of the virtual object A is not located at the center of the field of view of the user (No at Step S58), the video generation unit 13 transmits the obtained determination result to the light control unit 14, and proceeds to Step S57. At Step S57, the light control unit 14 increases the transmittance of the predetermined area of the second display unit 12 that corresponds to the image of the virtual object A. Then, the second display unit 12 enters a state in which the light emitted from the real space is likely to be transmitted in the predetermined area, and the background side of the image of the virtual object A becomes brighter. As a result, the user is able to visually recognize the image of the physical object B through the image of the virtual object A. In other words, the user visually recognizes the image of the virtual object A while walking, and, in addition, the user is able to visually recognize the image of the physical object B, that is, the background image of the surroundings, through the image of the virtual object A, and is able to safely walk.

Third Embodiment

FIG. 10 is a schematic diagram illustrating a specific configuration of a display device according to a third embodiment.

In the third embodiment, as illustrated in FIG. 1, a display device 10B includes the first display unit 11, the video generation unit 13, the illuminance sensor 15, and the storage unit 16.

Here, the first display unit 11, the video generation unit 13, the illuminance sensor 15, the storage unit 16 have the same configurations and functions as those described in the first embodiment; therefore, the descriptions thereof will be omitted.

The display device 10B allows the reflected light Lb (the display light La) that generates the image of the virtual object A by the first display unit 11 and the real image light Lc that generates the image of the physical object B that is present in the real space to reach the eyeballs of the user. As a result, the user visually recognizes a composite image in which the image of the virtual object A is superimposed on top of the image of the physical object B that is present in the real space.

At this time, if the light control unit 14 determines that the brightness of the image of the physical object B that is present in the real space is higher than the brightness of the image of the virtual object A, and, if the light control unit 14 determines that the brightness of the image of the virtual object A is close to the brightness of the image of the physical object B that is present in the real space, the light control unit 14 transmits the obtained determination result to the video generation unit 13. The video generation unit 13 performs an enhancement process on the image of the virtual object A on the basis of the transmitted determination result.

Figure 11A:
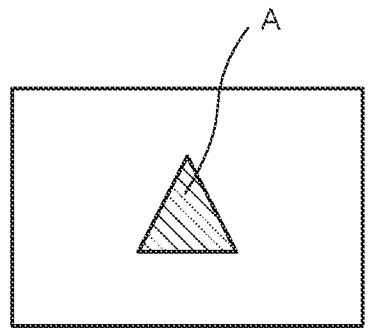
FIG. 11A is a schematic diagram illustrating an image of a virtual object.
Figure 11B:
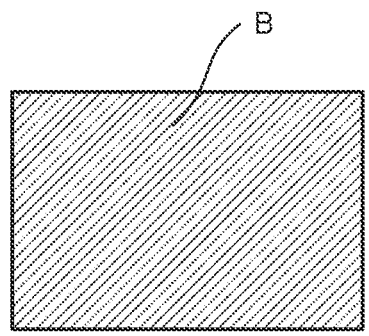
FIG. 11B is a schematic diagram illustrating one example of an image of a real space.
Figure 11C:
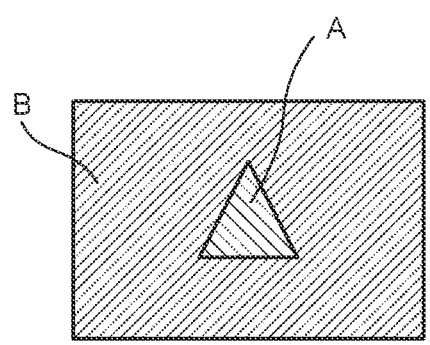
FIG. 11C is a schematic diagram illustrating one example of an image obtained by superimposing the image of the virtual object on top of the image of the real space.
Figure 11D:
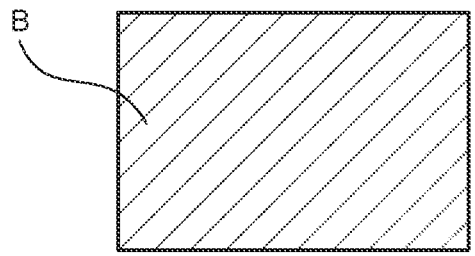
FIG. 11D is a schematic diagram illustrating one example of an image of a real space.
Figure 11E:
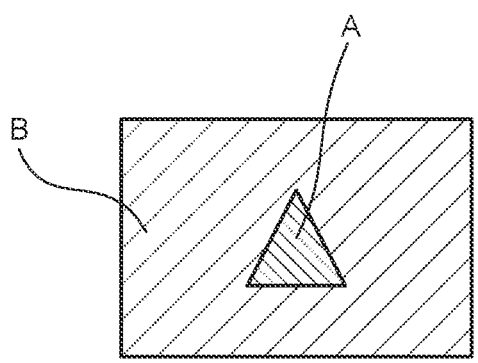
FIG. 11E is a schematic diagram illustrating one example of an image obtained by superimposing the image of the virtual object on top of the image of the real space.
Figure 11F:
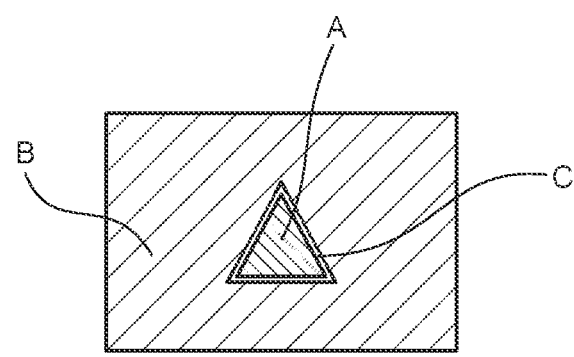
FIG. 11F is a schematic diagram illustrating an image obtained by superimposing the image of the virtual object on top of the image of the real space and performing an enhancement process on the obtained image.

FIG. 11A is a schematic diagram illustrating an image of a virtual object, FIG. 11B is a schematic diagram illustrating one example of an image of a real space, FIG. 11C is a schematic diagram illustrating one example of an image obtained by superimposing the image of the virtual object on top of the image of the real space, FIG. 11D is a schematic diagram illustrating one example of an image of a real space, FIG. 11E is a schematic diagram illustrating one example of an image obtained by superimposing the image of the virtual object on top of the image of the real space, and FIG. 11F is a schematic diagram illustrating an image obtained by superimposing the image of the virtual object on top of the image of the real space and performing the enhancement process on the obtained image.

As illustrated in FIG. 11A, the image of the virtual object A is displayed on the first display unit 11. As illustrated in FIG. 11B, the image of the physical object B that is present in the real space and whose brightness is low is acquired. As illustrated in FIG. 11C, a composite image in which the image of the virtual object A is superimposed on top of the image of the physical object B that is present in the real space and whose brightness is low is displayed. Here, the brightness of the image of the physical object B that is present in the real space is lower than the brightness of the image of the virtual object A, so that the user is able to sharply and visually recognize the image of the virtual object A.

In contrast, as illustrated in FIG. 11D, the image of the physical object B that is present in the real space and that is a bright image is acquired. As illustrated in FIG. 11E, a composite image in which the image of the virtual object A is superimposed on top of the image of the physical object B that is present in the real space and that is a bright image is displayed. Here, the brightness of the image of the physical object B that is present in the real space is close to the brightness of the image of the virtual object A, so that it is difficult for the user to sharply and visually recognize the image of the virtual object A. Accordingly, as illustrated in FIG. 11F, the video generation unit 13 sharply displays the image of the virtual object A by performing the enhancement process of forming the edge C around the image of the virtual object A. The color of the edge C to be used is preferably white or black, or, preferably an opponent color of the color of the image of the virtual object A.

Figure 12A:
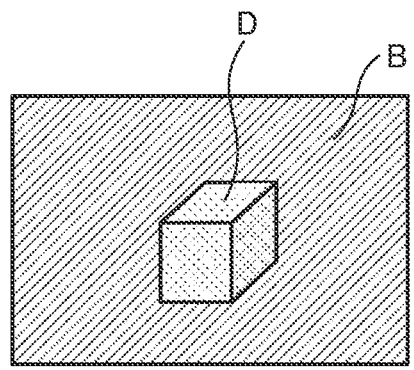
FIG. 12A is a schematic diagram illustrating one example of an image obtained by superimposing an image of a virtual object on top of an image of a real space.
Figure 12B:
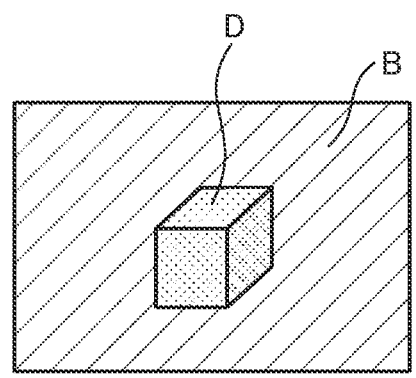
FIG. 12B is a schematic diagram illustrating one example of an image obtained by superimposing the image of the virtual object on top of the image of the real space.
Figure 12C:
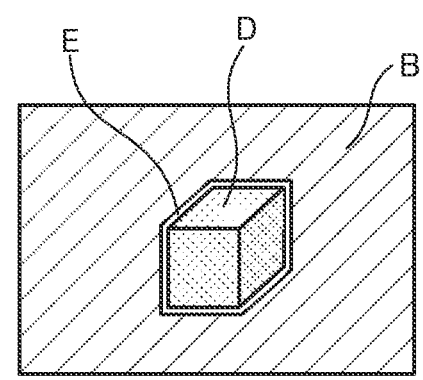
FIG. 12C is a schematic diagram illustrating an image obtained by superimposing the image of the virtual object on top of the image of the real space and performing an enhancement process on the obtained image.

FIG. 12A is a schematic diagram illustrating one example of an image obtained by superimposing an image of a virtual object on top of an image of a real space, FIG. 12B is a schematic diagram illustrating one example of an image obtained by superimposing the image of the virtual object on top of the image of the real space, and FIG. 12C is a schematic diagram illustrating an image obtained by superimposing the image of the virtual object on top of the image of the real space and performing an enhancement process on the obtained image.

As illustrated in FIG. 12A, a composite image in which a three-dimensional image of a virtual object D is superimposed on top of the image of the physical object B that is present in the real space and whose brightness is low is displayed. Here, the brightness of the image of the physical object B that is present in the real space is lower than the brightness of the three-dimensional image of the virtual object D, so that the user is able to sharply and visually recognize the three-dimensional image of the virtual object D.

In contrast, as illustrated in FIG. 12B, a composite image in which the three-dimensional image of the virtual object D is superimposed on top of the image of the physical object B that is present in the real space and that is a bright image is displayed. Here, the brightness of the image of the physical object B that is present in the real space is close to the brightness of the three-dimensional image of the virtual object D, it is difficult for the user to sharply and visually recognize the three-dimensional image of the virtual object D. Accordingly, as illustrated in FIG. 12C, the video generation unit 13 sharply displays the three-dimensional image of the virtual object D by performing the enhancement process of forming an edge E around the three-dimensional image of the virtual object D.

Operation and Effects of Embodiment

In the present embodiment, the illuminance sensor (outside light measurement unit) 15 that measures outside light, the video generation unit 13 that generates an object image, the first display unit 11 that displays an image of an object, the second display unit 12 that is arranged on the outer side of the first display unit 11, the light control unit (control unit) 14 that is able to adjust the transmittance of the area of the second display unit 12 are provided, and the light control unit adjusts the transmittance of the area of the second display unit 12 in accordance with the brightness of the outside light.

Accordingly, by adjusting the transmittance of the predetermined area of the second display unit 12 in accordance with the brightness of the outside light received from the real space, it is possible to allow the user to sharply and visually recognize the image of the object. As a result, it is possible to perform an optimum display by superimposing an image of a virtual object on top of an actual scene. For example, in the case where the brightness of the image viewed by outside light received from the real space is higher than the brightness of the image of the virtual object, it is possible to darken the image by reducing the transmittance of the predetermined area of the second display unit 12. As a result, the user is able to sharply and visually recognize the image of the virtual object.

In the present embodiment, the posture sensor (walk detection unit) 17 that detects a walk state of the user is provided, and the light control unit 14 adjusts the transmittance of the area of the second display unit 12 on the basis of the walk state of the user that has been detected by the posture sensor 17. Accordingly, when the user is walking, the transmittance of the predetermined area of the second display unit 12 that corresponds to the image of the virtual object is accordingly adjusted; therefore, the user is able to visually recognize the image by light that is incident from the real space and that passes through the image of the virtual object. As a result, the user is able to safely walk while sharply and visually recognizing the background image of the surroundings.

In the present embodiment, the video generation unit 13 adjusts the color of the image of the object in accordance with the brightness of outside light. Consequently, it is possible to sharply display the image of the virtual object.

In the above, the display device 10 according to the present disclosure has been described; however, the present disclosure may also be implemented with various kinds of embodiments other than the embodiments described above.

Each of the components included in the display device 10 illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

The configuration of the display device 10 is implemented as, for example, software, by programs, or the like loaded in a memory. In the embodiments described above, the description has been given as the functional blocks that are implemented in cooperation with these pieces of hardware or software. In other words, the functional blocks can be implemented in various forms by using only hardware, using only software, or using a combination of hardware and software.

The components described above include one that can easily be thought of by a person skilled in the art and one that is practically identical. Further, the configurations described above may be combined appropriately. Furthermore, various omissions, replacements, and modifications of the components may be made within the scope of the present invention.

In addition, in the embodiments described above, the first display unit 11 is configured by the first display panel 21, the half mirror 22, and the combiner mirror 23; however, the embodiments are not limited to this configuration and arrangement.

A program for performing the display method to control the display device may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, an advantage is provided in that it is possible to perform an optimum display by superimposing an image of a virtual object on top of an actual scene.

The display device, the display method, and the computer-readable storage medium according to the present disclosure is able to be applied to, for example, a head-mounted display.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
    an outside light measurement unit configured to acquire information on an image of a real space including a predetermined physical object;
    a video generation unit configured to generate an image of a virtual object;
    a first display unit configured to display the image of the virtual object;
    a second display unit arranged on an outer side of the first display unit; and
    a control unit configured to adjust a transmittance of an area of the second display unit, wherein
    the control unit is configured to reduce a transmittance of a predetermined area of the second display unit in response to a determination that a brightness of an image of the physical object on which the image of the virtual object is superimposed is higher than a brightness of the image of the virtual object, and increase the transmittance of the predetermined area of the second display unit in response to a determination that the brightness of the image of the physical object on which the image of the virtual object is superimposed is not higher than the brightness of the image of the virtual object, the predetermined area being superimposed on the image of the virtual object and having a size of the virtual object.

2. The display device according to claim 1, further comprising
    a walk detection unit configured to detect a walk state of a user, wherein
    the control unit is configured to increase the transmittance of the area of the second display unit and reduce the brightness of the image of the virtual object in response to a determination that the user detected by the walk detection unit is walking.

3. The display device according to claim 1, wherein the video generation unit adjusts a color of the image of the virtual object in accordance with the brightness of the image of the physical object on which the image of the virtual object is superimposed and the brightness of the image of the virtual object.

4. A display method comprising:
   acquiring information on an image of a real space including a predetermined physical object;
   generating an image of a virtual object;
   displaying the image of the virtual object on a first display unit; and
   reducing a transmittance of a predetermined area of a second display unit that is arranged on an outer side of the first display unit in response to determining that a brightness of an image of the physical object on which the image of the virtual object is superimposed is higher than a brightness of the image of the virtual object, and increasing the transmittance of the predetermined area of the second display unit in response to determining that the brightness of the image of the physical object on which the image of the virtual object is superimposed is not higher than the brightness of the image of the virtual object, the predetermined area being superimposed on the image of the virtual object and having a size of the virtual object.

5. A non-transitory computer-readable storage medium storing a program for controlling a display device, the program causing a computer to execute:
   acquiring information on an image of a real space including a predetermined physical object;
   generating an image of a virtual object;
   displaying the image of the virtual object on a first display unit included in the display device; and
   reducing a transmittance of a predetermined area of a second display unit that is included in the display device and arranged on an outer side of the first display unit in response to determining that a brightness of the image of the physical object on which the image of the virtual object is superimposed is higher than a brightness of the image of the virtual object, and increasing the transmittance of the predetermined area of the second display unit in response to determining that the brightness of the image of the physical object on which the image of the virtual object is superimposed is not higher than the brightness of the image of the virtual object, the predetermined area being superimposed on the image of the virtual object and having a size of the virtual object.

\* \* \* \* \*